Patented Sept. 21, 1954

2,689,797

UNITED STATES PATENT OFFICE 2,689,797

IMPROVED BREAD AND METHOD OF
PRODUCING THE SAME

Morris H. Joffe, Chicago, Ill., assignor to The
Emulsol Corporation, Chicago, Ill., a corporation of Illinois No Drawing. Application August 31, 1953,
Serial No. 377,674

36 Claims. (Cl. 99—91)

My invention relates to improvements in bread and the production thereof, and shortenings for use therein.

I have discovered, as disclosed in my application Serial No. 57,617, filed October 30, 1948, that if certain ingredients, hereafter described in detail, are incorporated in the bread dough batch, the bread dough itself as well as the final baked bread are markedly improved in a number of respects. So far as the bread dough is concerned, the incorporation therein of said addition ingredients results in the production of a silkier and drier dough and one which is easier to handle in makeup than the same dough without said addition ingredients. With respect to the final baked bread or finished loaf, the practice of my present invention brings about decided improvement in texture, softness and silkiness of feel, a tender crust and crumb, and excellent chewing characteristics, as well as an improvement in volume and retention of softness and flavor over a longer period of time.

The addition agents which achieve these results are higher molecular weight partial ethers or partial esters of aliphatic polyhydroxy substances or long chain alcohols esterified with carboxylic acid esters of hydroxy polycarboxylic acids. Those compounds of this class which are used pursuant to the present invention must, of course, be edible or non-toxic or, in other words, innocuous. The higher molecular weight or long chain radical should contain at least 8 carbon atoms and is preferably within the range of 8 to 18 carbon atoms. The carboxylic acid esters of the hydroxy polycarboxylic acids, which are conveniently utilized in the form of their anhydrides in the production of the addition agents, should be derived from hydroxy polycarboxylic acids containing not more than 8 carbon atoms, those containing 4 to 6 carbon atoms being particularly preferred. The carboxylic acid radical of said esters of hydroxy carboxylic acid is derived from lower molecular weight acids such as acetic acid, propionic acid and the like.

Illustrative examples of addition agents which may be utilized pursuant to my present invention are the following:

(1) Diacetyl tartaric acid ester of monostearin or mixtures of monostearin and distearin.

(2) Monoacetyl citric acid ester of monostearin or mixtures of monostearin and distearin.

(3) Diacetyl tartaric acid ester of mono-olein or mixtures of mono-olein and di-olein.

(4) Diacetyl tartaric acid esters of mixed mono- and di-glycerides derived from corn oil fatty acids.

(5) Diacetyl tartaric acid esters of mixed mono- and di-glycerides derived from cottonseed oil fatty acids.

(6) Diacetyl tartaric acid esters of mixed mono- and di-glycerides derived from soya bean oil fatty acids.

(7) Diacetyl tartaric acid esters of mixed mono- and di-glycerides derived from palm oil fatty acids.

(8) Dipropionyl tartaric acid esters of mixed mono- and di-glycerides derived from triple pressed stearic acid.

(9) Diacetyl tartaric acid esters of corn oil fatty acid mono-esters of diglycerol.

(10) Diacetyl tartaric acid esters of corn oil fatty acid mono-esters of mannitol.

(11) Diacetyl tartaric acid esters of partially hydrogenated cottonseed oil fatty acid mono- and di-esters of sorbitol.

(12) Diacetyl tartaric acid esters of soya bean oil fatty acid mono-esters of sorbitan or mannitan.

(13) Monoacetyl citric acid esters of mixed mono- and di-glycerides derived from coconut oil fatty acids.

(14) Diacetyl tartaric acid ester of propylene glycol mono-esters of corn oil fatty acids.

(15) Diacetyl tartaric acid ester of polyethylene glycol mono-esters of triple pressed stearic acid (M. W. of polyethylene glycol about 200).

(16) Diacetyl tartaric acid ester of palmityl mono-ether of glycerol.

(17) Monoacetyl citric acid ester of oleyl mono-ether of glycerol.

(18) Dipropionyl tartaric acid ester of stearyl mono-ether of mannitol.

(19) Diacetyl tartaric acid ester of oleyl alcohol.

(20) Diacetyl tartaric acid ester of cetyl alcohol.

(21) Monoacetyl citric acid ester of stearyl alcohol.

(22) Monoacetyl malic acid ester of corn oil fatty acid mono- and di-glycerides.

(23) Diacetyl tartaric acid esters of mixed mono- and di-glycerides derived from lard fatty acids.

(24) Diacetyl tartaric acid esters of partially hydrogenated cottonseed oil fatty acid mono- and di-esters of sorbitan and mannitan.

(25) Diacetyl tartaric acid esters of mixtures of mono- and di-glycerides produced by re-esterifying lard, tallow or partially or completely hydrogenated cottonseed oil, or mixtures of any two or more of said fats and oils, with glycerin, wherein the mono- and di-glyceride content of said re-esterification product is between 30 and 40% prior to the reaction to produce the diacetyl tartaric acid esters thereof.

Addition agents of the type which I have found to be especially useful in accordance with my present invention, and which are exemplified by the illustrative examples set forth above, are among the chemical compounds disclosed in U. S.

Patent No. 2,236,516, issued April 1, 1941, and, therefore, a detailed description of other members of the class and methods of manufacture are deemed unnecessary. I have found it to be particularly advantageous to utilize diacetyl tartaric acid esters of monoglycerides or diglycerides or mixtures of mono- and di-glycerides derived from fatty acids containing predominately 16 to 18 carbon atoms as, for example, fatty acids derived from naturally occurring or hydrogenated animal and vegetable oils and fats such as corn oil, cottonseed oil, soya bean oil, lard, tallow, and the like, said finished esters containing at least one free carboxyl group. While free carboxyl groups present in the addition agents may be neutralized, I find it more advantageous to use the unneutralized addition agents.

The addition agents may be incorporated into the bread dough batch in a straight dough or in either the sponge or the dough or in both the sponge and the dough in a sponge-dough system. In general, I prefer that all of the addition agent which is employed be added to the sponge; generally speaking, to produce a given effect, a smaller proportion is required when the addition agent is introduced in the sponge. It is convenient to admix said addition agents, prior to incorporation into the dough batch, with a farinaceous diluent such as starch or flour. Alternatively, the addition agents may be incorporated into the shortenings for use in bread as, for example, lard, compound, and other dry shortenings conventionally used in bread baking.

The amount of addition agent utilized is somewhat variable, it being understood, of course, that the different addition agents will usually be found to have slightly different efficacies. In all cases, however, the proportions in the bread are quite small. In most cases, good results are obtained with the use of about 0.1% or 0.3% to 1% of the addition agent, based on the total weight of the flour in the bread formula. It is rarely necessary to exceed about 1.5% and, indeed, if the amount of addition agent is excessive, it adversely affects the texture and quality of the finished loaf. In practice, proportions of about 0.25% to 1%, e. g. 0.5% to 0.8%, based on the total weight of the flour, give good results in most cases.

The addition agent can be added to farinaceous compositions or fatty shortenings and these can then be used in the bread dough. When incorporated into such farinaceous compositions or shortenings, the proportions are variable ranging, for example, from about 10% to about 30%, by weight of the farinaceous material or shortening.

The invention is of value in the production of white bread, rye bread, whole wheat bread and the like but it finds its greatest utility in white bread. In this connection, it may be pointed out that the term "bread," as used herein, is employed in a narrow sense to mean loaf bread and is not intended to include biscuits, buns, and rolls. It will be understood that the invention may be utilized with any bread formula or bread making process. Thus, for example, in the case of white bread, either the sponge and dough method or the straight dough method may be employed.

As described in my copending application Serial No. 297,410, filed July 5, 1952, which is a continuation-in-part of my aforementioned application Serial No. 57,617, in those instances wherein the addition agents utilized are derived by reacting mono- and/or di-glycerides of higher molecular weight fat-forming fatty acids with lower molecular weight carboxylic acid esters of hydroxy polycarboxylic acids or anhydrides of the latter, for example, diacetyl tartaric acid anhydride, it has been found that, depending upon the manner in which such reaction is carried out and upon the proportions of reactants utilized, minor proportions of said mono- and/or di-glycerides remain as such, that is, unreacted with the diacetyl tartaric acid anhydride or the like. The content of such unreacted mono- and/or diglycerides in the reaction products is, as indicated, variable, in certain instances being substantially zero and in other instances being appreciable although, in any event, of distinctly minor degree. It has been found that, in those instances in which such adventitiously occurring mono- and/or di-glycerides are present in somewhat appreciable proportions, there appears to be a synergistic action therebetween and the diacetyl tartaric acid esters of said mono- and/or di-glycerides so that there is a substantial improvement in the bread dough and in the finished bread with respect to the characteristics and advantages which are disclosed in my patent application Serial No. 57,617 of which my application Serial No. 297,410 is a continuation-in-part.

Since the synergistic effects obtained from adventitiously present mono- and/or di-glycerides are erratic in the sense that such unreacted mono- and/or di-glycerides may or may not be present or even if present are there in inadequate amounts to obtain the most desirable results, it was found to be desirable, in many cases, completely or substantially completely to esterify the mono- and/or di-glycerides with the diacetyl tartaric acid ester anhydride, or the like, and then add thereto or utilize in conjunction therewith the desired and controlled proportion of unreacted mono- and/or di-glycerides. While the amount of added mono- and/or di-glycerides is somewhat variable, being dependent upon whether monoglycerides or diglycerides or mixtures predominating in one or the other thereof are utilized, and depending, also, upon specific results desired, in general, the content of mono- and/or di-glycerides, in relation to the content of the diacetyl tartaric acid esters or similar esters comprising the addition agents heretofore described herein, will usually vary from a somewhat lesser to a somewhat greater amount. Thus, for example, for each part by weight of the diacetyl tartaric acid esters or the like, from about ½ to about 1½ parts of the unreacted mono- and/or di-glycerides usually give excellent results. It has also been found that when the unreacted mono- and/or di-glycerides are used conjointly with the diacetyl tartaric acid esters or the like, the latter comprising the addition agents disclosed hereinabove, it is possible to obtain enhanced effects with substantially smaller proportions of the diacetyl tartaric acid esters or the like than are normally required. This aspect of my invention thus produces material economies since, in general, the unreacted mono- and/or di-glycerides are less expensive than are the diacetyl tartaric acid esters thereof.

I have found that, in place of or in addition to the unreacted mono- and/or di-glycerides, I may use partial esters of other aliphatic polyhydric alcohols with fat-forming higher molecular weight fatty acids. Typical examples of such partial esters are those of polyglycerols (such as diglycerol, triglycerol, tetraglycerol and mixtures thereof), sugars (such as dextrose, sucrose and maltose), and sugar alcohols (such as sorbitol, mannitol and dulcitol) with fatty acids or mixtures of fatty acids derived from tallow, lard oil, cottonseed oil, corn oil, soya bean oil, peanut oil and the like or partially hydrogenated animal and vegetable oils, said esters containing one or more free or unesterified hydroxyl groups in the polyhydric alcohol radical. The proportions of said partial esters used may be of the same general order as that of the unreacted mono- and/or di-glycerides although, in the usual case, somewhat smaller proportions of the polyglycerol partial esters and similar partial esters can be used than the mono-and/or di-glycerides.

It will be understood that the utilization of the unreacted mono- and/or di-glycerides of fat-forming fatty acids and the other partial esters of aliphatic polyhydric alcohols can be taken advantage of not only in connection with the preparation of breads but, also, in the production of dry shortenings as disclosed herein. Thus, for example, in a case of such dry shortenings, the content of the diacetyl tartaric acid esters or the like can range from about 5% to about 20% and the mono- and/or di-glyceride or other partial ester content thereof can range from about 5% or somewhat less to about 15% or somewhat more.

I am aware, of course, that mono- and/or di-glycerides of fat-forming fatty acids and the other partial esters have heretofore been utilized in dry shortenings as well as in bread and I make no claim to any invention therein per se. However, as to the utilization of such mono- and/or di-glycerides and other partial esters, my present invention is predicated upon the utilization in conjunction therewith of the esters of the lower molecular weight carboxylic acid esters of hydroxy polycarboxylic acids exemplified, particularly, by diacetyl tartaric acid esters of mono- and/or di-glycerides of fat-forming higher molecular weight fatty acids.

The following examples are illustrative of the practice of my invention as applied to a typical white bread formula, using the sponge and dough procedure as well as the straight dough method. It will be understood, as indicated above, that numerous other bread formulae may be employed together with others of the addition agents without departing from the guiding principles disclosed herein. The proportions recited are by weight.

EXAMPLE 1

Sponge

| | |
|---|---|
| Bread flour | 60.0 |
| Water | 33.0 |
| Yeast | 2.0 |
| "Arkady" yeast food | 0.4 |
| Shortening | 3.0 |
| Diacetyl tartaric acid ester of mixed mono- and di-glycerides of lard fatty acids | 0.5 |

The sponge temperature was 76 degrees F. and the fermentation time was 230 minutes.

Dough

| | |
|---|---|
| Bread flour | 40.0 |
| Water | 27.0 |
| Skim milk powder | 2.0 |
| Sucrose | 2.0 |
| Salt | 2.0 |

The dough was mixed at 85 degrees F. and was then allowed to stand for 15 minutes. It was then handled in accordance with conventional practice. The finished loaf had excellent volume, improved texture and a cut section had a silky feel.

EXAMPLE 2

This example was carried out in the same way as described in Example 1 except that the diacetyl tartaric acid ester of the mixed mono- and di-glycerides of the lard fatty acids and shortening were omitted from the sponge and were incorporated into the dough along with the milk, sugar and salt.

EXAMPLE 3

Straight dough

| | |
|---|---|
| Bread flour | 100.0 |
| Water | 61.0 |
| Salt | 2.2 |
| Sugar | 4.5 |
| Skim milk powder | 4.0 |
| Yeast | 2.0 |
| Yeast food | 0.4 |
| Shortening | 2.8 |
| Diacetyl tartaric acid ester of mixed mono- and di-glycerides of lard fatty acids | 0.5 |

The ingredients were mixed to form the dough and the dough was then handled in accordance with conventional straight dough practice. The finished loaf had excellent volume and texture and softness.

EXAMPLE 4

Sponge

| | |
|---|---|
| Bread flour | 60.0 |
| Water | 33.0 |
| Yeast | 2.0 |
| "Arkady" yeast food | 0.4 |
| Shortening | 3.0 |
| Diacetyl tartaric acid ester of mixed mono- and di-glycerides of lard fatty acids | 0.2 |
| Lard fatty acid mono-gycerides | 0.2 |

The sponge temperature was 76 degrees F. and the fermentation time was 230 minutes.

Dough

| | |
|---|---|
| Bread flour | 40.0 |
| Water | 27.0 |
| Skim milk powder | 2.0 |
| Sucrose | 2.0 |
| Salt | 2.0 |

The dough was mixed at 85 degrees F. and was then allowed to stand for 15 minutes. It was then handled in accordance with conventional practice.

It will be noted that the proportions of ingredients set forth in this Example 4 are the same as those of Example 1 with the exception that, instead of 0.5 part of the diacetyl tartaric acid ester of mixed mono- and di-glycerides of lard fatty acids there is utilized 0.2 part thereof and, in addition, 0.2 part of lard fatty acid monoglycerides. The finished loaf, in Example 4, showed a volume, texture and silkiness, in a cut section, superior to the finished loaf of Example 1 notwithstanding the fact that the diacetyl tartaric acid ester of the mixed mono- and di-glycerides of lard fatty acids had been reduced by more than half of the quantity used in Example 1 and had been replaced by an equal quantity of lard fatty acid monoglycerides. Controlled loaves made by a procedure similar to that described in Example 1 with, on the one hand, 0.2 part by weight of the lard monoglyceride used alone as the addition agent and, on the other hand, made with 0.2 part by weight of diacetyl tartaric acid ester used alone as the addition agent were not comparable in their desired characteristics with the loaf obtained in accordance with Example 4.

EXAMPLE 5

This example was carried out in the same manner as described in Example 3 with the exception that the amount of diacetyl tartaric acid ester of mixed mono- and di-glycerides of lard fatty acids was reduced from 0.5 part to 0.15 part, and 0.25 part by weight of mixed mono- and di-glycerides of lard fatty acids were utilized in conjunction with said 0.15 part of the diacetyl tartaric acid ester. Again, the finished loaf had improved properties and characteristics in relation to the loaves produced in accordance with Example 3.

EXAMPLE 6

This example was carried out in the same manner as described in Example 3 with the exception that the amount of diacetyl tartaric acid ester of mixed mono- and di-glycerides of lard fatty acids was reduced from 0.5 part to 0.2 part, and 0.2 part by weight of lard fatty acid mono-esters of diglycerol were utilized in conjunction with said 0.2 part of the diacetyl tartaric acid ester. The finished loaf had excellent properties and characteristics.

This application is a continuation-in-part of my prior application Serial No. 297,410, filed July 5, 1952, which latter is, in turn, a continuation-in-part of my application Serial No. 57,617, filed October 30, 1948, now abandoned.

What I claim as new and desire to protect by Letters Patent of the United States is:

1. In a method of baking bread, the improvement which comprises incorporating into the dough batch, prior to baking, a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms.

2. In a method of baking bread, the improvement which comprises incorporating into the dough batch, prior to baking, a small quantity of innocuous addition agent in the form of an ester of an aliphatic alcohol containing a chain of 16 to 18 carbon atoms with a lower molecular weight carboxylic acid ester of an hydroxy polycarboxylic acid, the lower molecular weight carboxylic acid acyl radical of said ester containing from 2 to 4 carbon atoms, said ester containing at least one free carboxyl group.

3. In a method of baking bread, the improvement which comprises incorporating into the dough batch, prior to baking, a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, said addition agent containing at least one free carboxyl group.

4. In a method of baking bread, the improvement which comprises incorporating into the dough batch, prior to baking, from about 0.1% to about 1%, based on the weight of the flour, of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms.

5. In a method of baking bread, the improvement which comprises incorporating into the dough batch, prior to baking, a small quantity of an innocuous addition agent in the form of an ester of an alcohol containing a chain of 16 to 18 carbon atoms with an acetic acid ester of an hydroxy polycarboxylic acid, said ester containing at least one free carboxyl group.

6. In a method of baking bread, the improvement which comprises incorporating into the dough batch, prior to baking, a small quantity of an innocuous chemical compound containing at least one carboxyl group in its molecule and comprising a reaction product of a lower molecular weight aliphatic carboxylic acid ester of an aliphatic hydroxy polycarboxylic acid anhydride and a member selected from the group consisting of higher molecular weight partial ethers and partial esters of aliphatic polyhydroxy substances.

7. In a method of baking bread, the improvement which comprises incorporating into the dough batch, prior to baking, a small quantity of an innocuous chemical compound comprising a reaction product of an anhydride of an acetic acid ester of an aliphatic hydroxy polycarboxylic acid and a member selected from the group consisting of higher molecular weight partial ethers and partial esters of aliphatic polyhydroxy substances, said higher molecular weight radical containing predominately from 16 to 18 carbon atoms.

8. In a method of baking bread, the improvement which comprises incorporating into the dough batch, prior to baking, a small quantity of an innocuous ester of an acetyl polycarboxylic acid with a fatty acid partial ester of an aliphatic polyhydroxy substance in which the fatty acid radical contains predominately from 12 to 18 carbon atoms.

9. In a method of baking bread, the improvement which comprises incorporating into the dough batch, prior to baking, a small quantity of an innocuous ester of diacetyl tartaric acid with a fatty acid partial ester of an aliphatic polyhydroxy substance in which the fatty acid radical contains predominately from 16 to 18 carbon atoms, said ester containing at least one free carboxyl group.

10. In a method of baking bread, the improvement which comprises incorporating into the dough batch, prior to baking, from about 0.3% to 0.8%, based on the weight of the flour, of an ester of diacetyl tartaric acid with a fatty acid partial ester of glycerin in which the fatty acid radical contains predominately from 16 to 18 carbon atoms.

11. In a method of baking bread, the improvement which comprises incorporating into the dough batch, prior to baking, a small quantity of an ester of diacetyl tartaric acid with mixed mono- and di-glycerides of fatty acids derived from vegetable and animal oils and fats in which the fatty acid radicals contain predominately from 16 to 18 carbon atoms.

12. An improved bread resulting from the incorporation into the dough prior to baking of a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms.

13. An improved bread resulting from the incorporation into the dough prior to baking of a small quantity of an innocuous addition agent in the form of an ester of an alcohol containing a chain of 16 to 18 carbon atoms with a lower molecular weight carboxylic acid ester of an hydroxy polycarboxylic acid, the lower molecular weight carboxylic acid acyl radical of said ester containing from 2 to 4 carbon atoms, said ester containing at least one free carboxyl group.

14. An improved bread resulting from the incorporation into the dough prior to baking of a small quantity of an innocuous ester of an acetyl polycarboxylic acid with a fatty acid partial ester of an aliphatic polyhydroxy substance in which the fatty acid radical contains predominately from 12 to 18 carbon atoms.

15. An improved bread resulting from the incorporation into the dough prior to baking of a small quantity of an innocuous ester of diacetyl tartaric acid with a fatty acid partial ester of an aliphatic polyhydroxy substance in which the fatty acid radical contains predominately from 16 to 18 carbon atoms.

16. An improved bread resulting from the incorporation into the dough prior to baking of a small quantity of an ester of diacetyl tartaric acid with a fatty acid partial ester of glycerin in which the fatty acid radical contains predominately from 16 to 18 carbon atoms, said ester containing at least one free carboxyl group.

17. An improved bread resulting from the incorporation into the dough prior to baking of about 0.1% to 1%, based on the weight of the flour, of an ester of diacetyl tartaric acid with mixed mono- and di-glycerides of fatty acids derived from vegetable oils and fats in which the fatty acid radicals contain predominately from 16 to 18 carbon atoms.

18. An improved bread resulting from the incorporation into the dough prior to baking of a small quantity of an innocuous chemical compound containing at least one carboxyl group in its molecule and comprising a reaction product of a lower molecular weight aliphatic carboxylic acid ester of an aliphatic hydroxy polycarboxylic acid anhydride and a member selected from the group consisting of higher molecular weight partial ethers and partial esters of aliphatic polyhydroxy substances.

19. An improved bread resulting from the incorporation into the dough prior to baking of from about 0.3% to 0.8%, based on the weight of the flour, of an innocuous chemical compound containing at least one carboxyl group in its molecule and comprising a reaction product of a lower molecular weight aliphatic carboxylic acid ester of an aliphatic hydroxy polycarboxylic acid anhydride and a member selected from the group consisting of higher molecular weight partial ethers and partial esters of aliphatic polyhydroxy substances, said higher molecular weight radical containing predominately from 16 to 18 carbon atoms.

20. A dry fatty shortening containing at least several per cent of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms.

21. A dry fatty shortening containing from about 10% to about 30% of an innocuous addition agent in the form of an ester of an alcohol containing a chain of 16 to 18 carbon atoms with a lower molecular weight carboxylic acid ester of an hydroxy polycarboxylic acid, the lower molecular weight carboxylic acid acyl radical of said ester containing from 2 to 4 carbon atoms.

22. A dry fatty shortening containing at least several per cent of an innocuous ester of an acetyl polycarboxylic acid with a fatty acid partial ester of an aliphatic polyhydroxy substance in which the fatty acid radical contains predominately from 12 to 18 carbon atoms, said ester containing at least one free carboxyl group.

23. A dry fatty shortening containing at least several per cent of an innocuous ester of diacetyl tartaric acid with a fatty acid partial ester of an aliphatic polyhydroxy substance in which the fatty acid radical contains predominately from 16 to 18 carbon atoms.

24. A dry fatty shortening containing at least several per cent of an ester of diacetyl tartaric acid with a fatty acid partial ester of glycerin in which the fatty acid radical contains predominately from 16 to 18 carbon atoms, said ester containing at least one free carboxyl group.

25. In a method of baking bread, the improvement which comprises incorporating into the dough batch, prior to baking, a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, and a small quantity of at least one member of the group consisting of monoglycerides and diglycerides of fat-forming higher molecular weight fatty acids.

26. In a method of baking bread, the improvement which comprises incorporating into the dough batch, prior to baking, a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 4 carbon atoms, and a small quantity of at least one member selected from the group consisting of monoglycerides and diglycerides of fatty acids derived from vegetable and animal oils and fats in which the fatty acid radicals contain predominately from 16 to 18 carbon atoms.

27. An improved bread resulting from the incorporation into the dough prior to baking of a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, and a small quantity of at least one member of the group consisting of monoglycerides and diglycerides of fat-forming higher molecular weight fatty acids.

28. An improved bread resulting from the incorporation into the dough prior to baking of a small quantity of an ester of diacetyl tartaric acid with a fatty acid partial ester of glycerin in which the fatty acid radical contains predominately from 16 to 18 carbon atoms, said ester containing at least one free carboxyl group, and a small quantity of at least one member selected from the group consisting of monoglycerides and diglycerides of fatty acids derived from vegetable and animal oils and fats in which the fatty acid radicals contain predominately from 16 to 18 carbon atoms.

29. A dry fatty shortening containing at least several per cent of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, and at least several per cent of at least one member selected from the group consisting of monoglycerides and diglycerides of fat-forming higher molecular weight fatty acids.

30. A dry fatty shortening containing at least several per cent of an ester of diacetyl tartaric acid with a fatty acid partial ester of glycerin in which the fatty acid radical contains predominately from 16 to 18 carbon atoms, said ester containing at least one free carboxyl group, and at least several per cent of at least one member selected from the group consisting of monoglycerides and diglycerides of fatty acids derived from vegetable and animal oils and fats in which the fatty acid radicals contain predominately from 16 to 18 carbon atoms.

31. In a method of baking bread, the improvement which comprises incorporating into the dough batch, prior to baking, a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, and a small quantity of an innocuous partial ester of an aliphatic polyhydric alcohol with fat-forming higher molecular weight fatty acids.

32. In a method of baking bread, the improvement which comprises incorporating into the dough batch, prior to baking, a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 4 carbon atoms, and a small quantity of an innocuous partial ester of a polyglycerol with fatty acids derived from vegetable and animal oils and fats in which the fatty acid radicals contain predominately from 16 to 18 carbon atoms.

33. An improved bread resulting from the incorporation into the dough prior to baking of a small quantity of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, and a small quantity of an innocuous partial ester of an aliphatic polyhydric alcohol with fat-forming higher molecular weight fatty acids.

34. An improved bread resulting from the incorporation into the dough prior to baking of a small quantity of an ester of diacetyl tartaric acid with a fatty acid partial ester of glycerin in which the fatty acid radical contains predominately from 16 to 18 carbon atoms, said ester containing at least one free carboxyl group, and a small quantity of an innocuous partial ester of a polyglycerol with fatty acids derived from vegetable and animal oils and fats in which the fatty acid radicals contain predominately from 16 to 18 carbon atoms.

35. A dry fatty shortening containing at least several per cent of an innocuous addition agent in the form of an ester of an alcohol containing a chain of at least 8 carbon atoms with a lower molecular weight carboxylic acid ester of an hydroxy polycarboxylic acid, the lower molecular weight carboxylic acid acyl radical of said ester containing from 2 to 6 carbon atoms, and at least several per cent of an innocuous partial ester of an aliphatic polyhydric alcohol with fat-forming higher molecular weight fatty acids.

36. A dry fatty shortening containing at least several per cent of an ester of diacetyl tartaric acid with a fatty acid partial ester of glycerin in which the fatty acid radical contains predominately from 16 to 18 carbon atoms, said ester containing at least one free carboxyl group, and at least several per cent of an innocuous partial ester of a polyglycerol with fatty acids derived from vegetable and animal oils and fats in which the fatty acid radicals contain predominately from 16 to 18 carbon atoms.

No references cited.